June 3, 1924.
G. JOHNSTON
PORTABLE FRESH MEAT STORAGE HOUSE
Filed Sept. 5, 1922
1,496,468
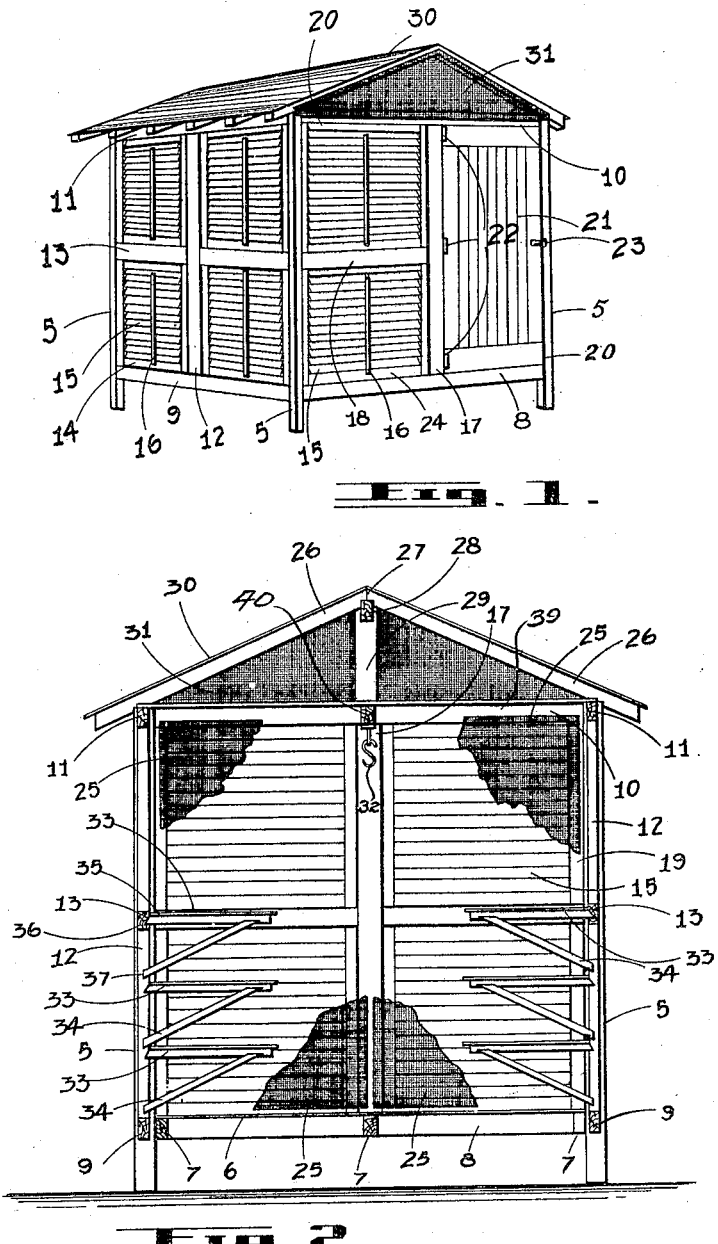
INVENTOR
George Johnston
BY E. H. Bond
ATTORNEY Patented June 3, 1924.

1,496,468

UNITED STATES PATENT OFFICE.

GEORGE JOHNSTON, OF CROSS CREEK, NEW BRUNSWICK, CANADA.

PORTABLE FRESH-MEAT-STORAGE HOUSE.

Application filed September 5, 1922. Serial No. 586,295.

*To all whom it may concern:*

Be it known that I, GEORGE JOHNSTON, a citizen of the Dominion of Canada, and resident of Cross Creek, in the county of York and Province of New Brunswick, Dominion of Canada, have invented certain new and useful Improvements in Portable Fresh-Meat-Storage Houses, of which the following is a specification.

This invention has relation to certain new and useful improvements in a portable fresh meat storage structure which will be of simple and inexpensive construction and through which fresh air may constantly circulate to keep cool the meat stored therein.

Another object of the invention resides in the provision of a portable fresh meat storage structure having the sides formed so that air may constantly pass through the same without permitting flies and other insects to enter the structure.

The invention has for a further object the provision of a portable fresh meat storage structure, in which the sides and ends will be constructed of slatted panels with inner covering screens and a doorway through which entrance to or exit from the structure may be made and which doorway may be closed by a close-fitting door mounted therein to prevent entrance of flies or the like through the doorway.

A still further object of the invention resides in the provision of a structure of the character stated, which will be extremely simple and inexpensive and in which a thorough circulation of air may be had from the floor to the roof, thereby preventing dead air from gathering within the top of the structure.

With the foregoing and other objects in view, as will appear as the description proceeds, the invention consists in the novel construction, combination and arrangement of co-operating elements, as hereinafter more specifically set forth, claimed and shown in the accompanying drawings forming a part of the present application, in which:

Fig. 1 is a perspective view of the structure.

Fig. 2 is a vertical transverse section through the structure shown in Fig. 1.

Referring more in detail to the drawings, in which similar reference characters designate corresponding parts throughout the several views, 5 designates the corner posts arranged at the corners of the floor 6. This floor 6 is mounted on the floor joists 7, which are shown as extending longitudinally and connecting at their ends with the front and rear beams 8 extended between and secured to the front and rear corner posts 5. The longitudinal beams 9 connect the front and rear corner posts 5, as shown clearly in the drawings. It will also be understood that the beams 8 and 9 are in the same horizontal plane and near the lower ends of the corner posts 5. The floor joists 7 are parallel with the longitudinal beams 9. The corner posts 5 are connected at their upper ends by the upper transverse beams 10 and upper longitudinal beams 11. This completes the framework of the structure.

Within each side of the framework structure is provided a central vertical dividing strip 12 which connects at its opposite ends with the lower longitudinal beam 9 and the upper longitudinal beam 11. The intermediate transverse dividing strips 13 are also included in each side of the frame structure and connected with the central vertical dividing strip 12 and the corner posts 5. The strips 12 and 13 serve to divide the sides into sections.

Within the sections of each side are the slatted body members 14 comprising frames having spaced and overlapping slats 15 pivotally mounted therein and connected intermediate their ends by the slat controlling rod 16. The body members 14 are secured in the side framework with the slat controlling rods 16 positioned outwardly, so that they may be readily actuated to open or close the slats 15 from the exterior of the structure.

Each end of the structure is provided with a vertical central dividing strip 17 and the rear end is further divided by the intermediate horizontal dividing strips 18, thereby providing four sections at the rear end, as on the sides of the structure. The slatted rear end body members 19 are secured in the rear end framework, as shown in Fig. 2. These slatted rear end body members 19 are of the same construction as the side body members 14 and therefore, need not be described in detail.

At the front end of the structure, only one intermediate horizontal dividing strip 18 is employed, thereby leaving a door opening 20 in one half of the front side.

This may be readily understood by referring to Fig. 1. In the door opening 20 is mounted the door 21 hinged along one vertical edge to the front vertical central dividing strip 17, as shown at 22. The door 21 is provided with a suitable latching or locking mechanism 23 at its opposite vertical edge for retaining the door 21 in closed position, as shown in Fig. 1.

The slatted front body members 24 are provided above and below the front intermediate horizontal dividing strip 18 to complete the front structure. These body members 24 are identical in construction to the side body members 14 and rear body members 19 and therefore, need no further detailed description. The slats in all of the body members 14, 19 and 24 are numbered 15, while the numeral 16 applies to the slat controlling rod of each body member. It will therefore be seen that the slats 15 of the body members 14, 19 and 24 may be readily regulated, as desired. In order to prevent flies and other insects from passing into the structure through the slatted body members 14, 19 and 24, a screen section 25 of fine mesh is provided over the inner side of each of the said body members 14, 19 and 24 This may be readily understood by referring to Fig. 2. The ceiling 39 is mounted on the upper transverse beams 10 and upper longitudinal beams 11 and also supported on the spaced longitudinal ceiling supporting beams 40, as will be readily understood by referring to Fig. 2. It will therefore be apparent that an air space is provided between the ceiling 39 and the roof 30 which will be later fully described. The meat is stored in the structure below the ceiling 39, as will also be more fully stated as the description proceeds.

The roof rafters 26 are mounted on the upper longitudinal side members 11 of the framework and connected at their bevelled upper ends, as shown at 27, at which point they are mounted on the upper longitudinal roof supporting beam 28. The beam 28 is carried by the upper ends of the central forward and rear upstanding supports 29, which latter are mounted centrally on the forward and rear ends of the ceiling 39, which will be understood by referring to Fig. 2. The roof 30 is mounted on the rafters 26, as shown clearly in the drawings and extends, together with the rafters 26, over the sides of the frame structure to protect the same from rain and snow. The ends of the roof 30 also extend a short distance over the ends of the frame structure to protect the same. End screen sections 31 are provided above the ceiling 39 and are secured to the ends of the latter and to the rafters 26 extended above the end upper transverse beam 10 to permit a circulation of air between the roof 30 and the ceiling 39 and thereby prevent the roof 30 and ceiling 39 from being overheated by the sun's rays.

Rows of meat suspending hooks 32 depend from the ceiling suspending beam 40 so that meats may be suspended in the upper portion of the structure where the air passing through the structure may reach the entire outer surface of the meat to cool and preserve the same. Shelves 33 are also provided. These shelves 33 are shown in Fig. 2 as being located in each side of the structure and connected with the dividing strips 13 and 18. Suitable inclined bracing members 34 are employed to brace and support the shelves 33. The shelves 33 have transverse supporting strips 35 on their under faces with bevelled extended outer ends engaged in recesses 36 in the intermediate transverse dividing strips 13 and in the vertical dividing strips 12. The bracing members 34 have bevelled lower ends secured in sockets 37 provided therefor in the vertical dividing strip 12 and bevelled upper ends engaged in sockets in the inner end portions of the transverse shelf supporting strips. The shelves 33 are spaced above one another and with the supporting and bracing members 34 and 35 constructed and arranged as stated, will be securely held in proper position to support a considerable weight, as will be readily understood by referring to the drawings.

It is believed the complete construction and operation of the meat storage structure will now be apparent from the foregoing paragraphs taken in connection with the accompanying drawings. It may be briefly stated, however, that fresh meat may be kept on the hooks 32 and the shelves 33 for a considerable period of time without danger of the meat spoiling, as fresh air is constantly circulating through the structure and around the meat, particularly the meat suspended on the hooks 32. The draft of air through the structure may be readily regulated by opening or closing the slats 15, as previously stated. In cool weather, the slats 15 may be completely closed if desired.

While the preferred embodiment of the invention has been disclosed, it is to be understood that minor changes may be resorted to within the scope of what is claimed without departing from the spirit of the invention.

What I claim as new is:

1. A meat housing structure comprising a framework; slatted body members mounted in said framework; a floor within said framework; a ceiling carried on said framework; meat supporting members carried by said ceiling; shelves within said framework; said structure having a doorway formed therein; a door for closing said doorway; said body members having screened coverings; a roof supported above said ceiling to provide an air space over said ceiling; and screen end members for the ends of said air space.

2. A meat housing structure having screened sides and ends; slatted body members for the sides and ends of the structure; said structure having a doorway formed in one end; a door for closing said doorway; means for retaining the door in closed position; a ceiling for said structure; a roof mounted above and spaced from said ceiling to provide an open ended air chamber above said ceiling; end screen members for said air chamber; and means within said structure for supporting meats below the ceiling where the meats will be protected and at the same time subjected to cooling and preserving air currents passing through the structure.

3. A meat housing structure comprising a framework; a floor within said framework; a ceiling mounted on said framework; slatted body members carried in said framework to form the sides and ends of the structure; the slats of said body members being adjustable to regulate the air currents passing through the structure; said structure having a doorway formed in one wall; a door for said doorway; means for retaining said door in closed position; screen covering members carried on the inner sides of said body members; a protecting roof mounted on said structure and having its central portion spaced above said ceiling to provide an air chamber over the ceiling with open ends; end screen members for closing the ends of said air chamber; shelves within said structure; and means for suspending meats from the ceiling to subject the meats to the cooling and preserving air currents passing through the structure.

4. A meat housing structure comprising a framework composed of corner members; upper and lower members connecting said corner members; a floor carried by the lower connecting members; a ceiling mounted on the upper connecting members; vertical and horizontal dividing strips extending between said corner posts and between said upper and lower connecting members to divide the sides and ends of the structure into sections; body members mounted in said sections; adjustable overlapping slats carried in said body members; a roof mounted above said ceiling to provide an air space between the ceiling and the roof; end screen members for said air space; shelves within said structure; and means depending from the ceiling to support meats in suspended position within said structure and subject the meats to the cooling and preserving air currents passing through the structure.

In testimony whereof, I affix my signature.

GEORGE JOHNSTON.